United States Patent [19]
Liedenbaum et al.

[11] Patent Number: 5,532,863
[45] Date of Patent: Jul. 2, 1996

[54] OPTICAL SIGNAL-REGENERATING UNIT AND TRANSMISSION SYSTEM COMPRISING SUCH A UNIT

[75] Inventors: Coen T. H. F. Liedenbaum; John J. E. Reid, both of Eindhoven, Netherlands

[73] Assignee: U.S. Philips Corporation, New York, N.Y.

[21] Appl. No.: 407,534

[22] Filed: Mar. 20, 1995

[30] Foreign Application Priority Data

Jul. 27, 1994 [EP] European Pat. Off. .............. 94202187

[51] Int. Cl.[6] ........................... H04B 10/02; H04B 10/00
[52] U.S. Cl. ........................................... 359/176; 359/161
[58] Field of Search ................................ 359/174, 176, 359/179, 184, 161; 375/214

[56] References Cited

U.S. PATENT DOCUMENTS 5,369,520  11/1994  Avramopoulos et al. ............... 359/174

OTHER PUBLICATIONS

"All–Optical Regenerator Based on Nonlinear Fiber Sagnac Interferometer", by M. Jinno et al, Electronics Letters, 2nd, Jul. 1992, vol. 28, No. 14, pp. 1350–1352.

Primary Examiner—Leo Boudreau
Assistant Examiner—Kinfe-Michael Negash
Attorney, Agent, or Firm—Leroy Eason

[57] ABSTRACT

An optical signal-regenerating unit for a received optical signal pulse series ($S_1$) having a modulation period T and a wavelength $\lambda_d$. The optical unit includes a pulsed laser for producing a regenerated pulse series $S_2$ having a pulse period equal to the modulation period T. Pulses of the received pulse series $S_1$ are injected into the pulsed laser at instants at which the energy of the injected pulse exceeds the energy of a pulse then being built up in the laser. By maintaining that relationship, the multimode spectrum of the pulse laser is converted into a single mode spectrum having a wavelength equal to the wavelength $\lambda_d$ of the received radiation.

4 Claims, 1 Drawing Sheet

OPTICAL SIGNAL-REGENERATING UNIT AND TRANSMISSION SYSTEM COMPRISING SUCH A UNIT

BACKGROUND OF THE INVENTION

1. Field of the Invention

The invention relates to an optical signal-regenerating unit having an input for receiving an optical signal pulse series to be regenerated, which signal pulse series has a modulation period T and a wavelength $\lambda_d$, and an output for supplying a regenerated signal pulse series, said unit comprising a pulsed laser for supplying a pulse series having a pulse period T.

2. Description of the Related Art

In optical transmission systems for long-distance information transport, an optical transmitter provided with a laser is used for converting a digital electric signal into optical pulses. The radiation from the laser is modulated in accordance with the signals to be transmitted. In this way, a series of optical pulses is formed which can be transported to an optical receiver via an optical transmission medium, for example an optical fiber, in which receiver they are reconverted to a digital electric signal. In such systems the aim is, inter alia longer transmission distances. However, this is impeded by a number of factors.

A first factor is that the width of the optical pulses propagating in the transmission medium increases as the length of the transmission medium increases. This pulse widening is due to the fact that the delay time in the transmission medium is different for radiation of different wavelengths. This phenomenon is referred to as dispersion. A pulse transmitted by an optical transmitter will generally comprise components of different wavelengths which arrive at the receiver at different instants due to the dispersion.

Another factor impeding the realisation of long transmission distances is the inaccurate definition of the pulse position with respect to the pulse period. This phenomenon is referred to as time jitter. It is caused by the fact that instabilities in the transmission medium will lead to a variation in the position of the signal pulses along the time axis. On the other hand, the clock signal, in other words the repetition time with which the arriving signal pulses are detected in the receiver, is a constant. In fact, the clock signal is determined as a mean value of a number of pulse periods of the signal pulse series. Due to the spread of the signal pulses with respect to time, caused by line instabilities, the relevant signal pulse and a pulse of the clock signal will not coincide and give rise to erroneous information in the receiver.

A third factor is variable damping. Due to disturbances in the transmission medium, variations in the pulse amplitudes of the signal pulse series will occur.

To reduce the detrimental effect of the above-mentioned factors on the transmission distance, a number of locations in the transmission medium may be provided with an optical unit for regenerating signal pulses.

Also the receiver itself may be provided with such a unit so as to regenerate the arrived signal pulses before these pulses are transmitted to the detection channels.

An optical unit for regenerating signal pulses of the type described in the opening paragraph is known, for example from the article "All-optical regenerator based on non-linear fiber Sagnac interferometer" by M. Jinno and M. Abe in Electronics Letters, July 1992, vol. 28, no. 14, pp. 1350–1352. The unit described in this article comprises an optical switch in the form of a known NOLM (non-linear optical loop mirror). The clock signal is applied to the input of the switch and split into two substantially equal sub-signals by a 50:50 coupler. The two sub-signals will traverse the ring in opposite directions. The signal pulse series is coupled into the ring itself as a control pulse series. The switch is open whenever a pulse of the signal pulse series, i.e. a "1" in the digital signal, travels in the ring along with the part of the clock signal propagating in that direction. During this period there will be such a phase difference between the two parts of the clock signal propagating in opposite directions that there will be constructive interference at the output of the switch. The pulses which are formed at the output of the switch thus have the intensity and the wavelength of the pulses of the clock signal.

A drawback of the known unit is that the signal pulses must be considerably amplified before they are injected into the ring of the optical switch and/or the length of the optical fiber of the ring must be quite large to reach a sufficient switching power, in other words to cause a sufficiently large phase difference between the two sub-signals of the clock signal propagating in opposite directions. In fact, the phase difference between the two sub-signals propagating in opposite directions is given by $\Delta\delta=2\pi.n_2.L.I$, in which $n_2$ is the non-linear coefficient of the refractive index of the optical fiber, L is the length of the optical fiber and I is the optical intensity of the signal pulse travelling along in the ring.

Such drawback is less predominant if use is made of, for example a known SLALOM (semiconductor laser amplifier optical mirror) for the optical switch, because the non-linearity of the amplifier instead of that of the optical fiber is used in this case.

However, a further considerable drawback occurring both in a NOLM and in a SLALOM as optical switches is that, whenever a regeneration has taken place, that changes the wavelength of the signal pulse series. The transmission system as a whole will therefore be more complicated because it is no longer sufficient to tune the complete system to a single wavelength. In fact, the pulse series supplied by the regenerating unit has taken over determination of the wavelength of the clock signal. This is undesirable, particularly for multiplex transmission systems, in which different signals are combined in one and the same channel and in which wavelength demultiplexing is used in the receiver.

SUMMARY OF THE INVENTION

It is an object of the invention to provide an optical unit for regenerating signal pulses in which time jitter and the consequences of dispersion and variable damping are largely eliminated from the signal pulse series, and which is based on a different principle. Moreover, a relatively low peak power of the pulses of the signal pulse series is sufficient and the optical unit is relatively compact. In addition, it may be implemented in such a way that the wavelength of the original signal pulse series to be transported is maintained throughout the trajectory.

According to the invention, the optical signal regenerating unit is characterized in that pulses of the signal pulse series to be regenerated are injected into the pulsed laser at instants for which it holds that $E(P_m)>E(LP_i)$, in which $E(P_m)$ is the energy at the relevant instant of a pulse of the signal pulse series injected into the pulsed laser and $E(LP_i)$ is the radiation energy of a pulse built up in the pulsed laser at the relevant instant.

A signal pulse series of wavelength $\lambda_d$ which has traversed at least a part of a transmission medium is applied to the input of the signal-regenerating unit. The unit comprises a pulsed laser having a pulse period T which is equal to and synchronized with the modulation period of the signal pulse series. The radiation of the signal pulse series is injected into the pulsed laser in the time intervals within which pulses are built up in this laser, in other words at instants at which the above-mentioned relation applies, so that the pulsed laser will be forced to supply optical pulses having a wavelength ($\lambda_d$) which is equal to that of the pulses injected at the relevant instants.

In fact, it is generally known that lasers are sensitive to laser radiation which reaches the active medium of the laser. The behaviour of the laser is mainly determined by events in the time intervals in which an optical pulse is built up. By injecting a sufficiently large number of photons in that time interval, these extra photons will determine the behaviour of the laser. The laser can thus be controlled in this way. The injection may take place at the front mirror or at the rear mirror of the laser.

After regeneration, the signal pulse series may be further passed through the transmission medium or distributed in one or more detection channels in the receiver.

A preferred embodiment of an optical unit according to the invention is characterized in that the pulsed laser is a diode laser having a Fabry-Pérot resonant cavity in which a mode fits in accordance with the wavelength of the signal pulse series to be regenerated.

By choosing a diode laser having a Fabry-Pérot resonant cavity for the pulsed laser of the unit, which cavity has a resonant mode which corresponds to the wavelength of the signal pulse series to be regenerated, its coupling into the pulsed laser will be optimal.

The input of the optical unit into which the pulses of the signal pulse series are injected may be, for example a facet of the diode laser.

A further embodiment of an optical unit according to the invention comprises a wavelength discriminator arranged in the path of the radiation transmitted by the pulsed laser after injection, which wavelength discriminator passes radiation of wavelength $\lambda_d$ only.

The radiation from the pulsed laser is preferably passed after injection through a wavelength discriminator so as to clearly distinguish a digital "0" and a digital "1" in the data signal to be transported. In fact, it is not excluded that radiation having a wavelength different from $\lambda_d$ also travels along through the transmission medium.

There are two different possible ways of adjusting the wavelength discriminator. The first possibility is to pass only radiation of wavelength $\lambda_d$ and block all radiation of other wavelengths. In this case the pattern of the original signal pulse series is directly taken over.

An alternative embodiment of the optical unit according to the invention comprises a wavelength discriminator which blocks radiation of wavelength $\lambda_d$ only.

In this case all other radiation is passed. A pulse pattern which is complementary to the pulse pattern of the original signal pulse series is thereby produced at the output of the wavelength discriminator. However, the latter method has the advantage that it is simpler to tune the wavelength of the discriminator because the selection wavelength of the discriminator, i.e. the wavelength passed by the discriminator, is then equal to the original wavelength of the pulsed laser, which elements are located relatively close together.

If the unit according to the invention is used as a repeater station in the transmission medium, the first possibility is preferred because it is desirable to maintain the same wavelength for the signal pulse series throughout the transmission medium. If the unit according to the invention is used in a receiver, the second possibility is preferably applied because the adjustment of the wavelength discriminator will then be simpler.

The invention further relates to a receiver suitable for use in an optical transmission system. This receiver is characterized in that it is provided with an optical unit for regenerating signal pulses as described hereinbefore.

Since the discrimination after regeneration is based on wavelength, the optical unit is provided with a wavelength discriminator in this case so as to make a minimum number of errors in the detection.

The invention further relates to an optical transmission system comprising a transmitter and a receiver and is characterized in that at least one optical unit for regenerating signal pulses as described hereinbefore is arranged between the transmitter and the receiver.

By providing the transmission medium with one or more of these optical units for regenerating signal pulses, the transmission distance can be lengthened considerably.

Another embodiment of an optical transmission system comprising a transmitter and a receiver and a transmission medium arranged in between is characterized in that at least the receiver is provided with an optical signal-regenerating unit as described hereinbefore.

Before signal pulse series which have arrived in the receiver are detected, they are to be regenerated first so as to considerably reduce the consequences of the dispersion, time jitter and variable damping occurring during transmission. An optical unit according to the invention is particularly suitable for this purpose.

BRIEF DESCRIPTION OF THE DRAWINGS

These and other aspects of the invention will be apparent from and elucidated with reference to the embodiments described with reference to the accompanying drawings, wherein.

DESCRIPTION OF THE PREFERRED EMBODIMENTS

Figure 1:
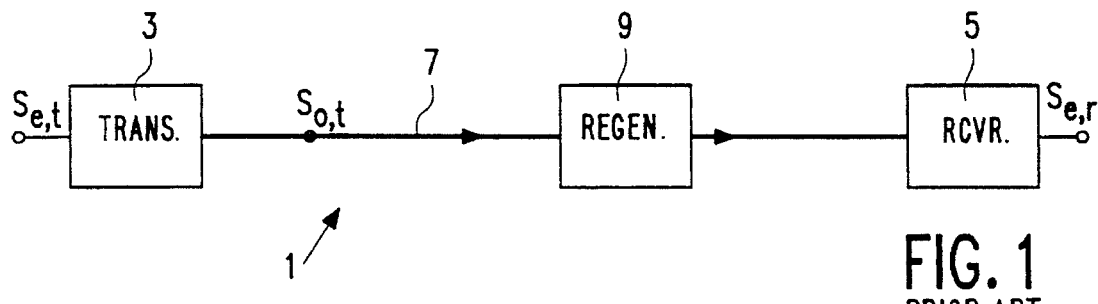
FIG. 1 shows diagrammatically an embodiment of a known transmission system provided with an optical signal-regenerating unit.

The transmission system 1 shown in FIG. 1 comprises an optical transmitter 3 and an optical receiver 5. A transmission medium 7 is arranged between the transmitter 3 and the receiver 5. A digital electric signal $S_{e,t}$ to be transmitted is applied to the optical transmitter 3. This signal is converted in the transmitter 3 into optical pulses $S_{o,t}$. The output of the transmitter 3 is connected to the input of the transmission medium 7, for example an optical fiber whose output is connected to an input of the receiver 5. After transport of the optical pulses through the transmission medium 7, the optical pulses are reconverted in the receiver 5 into a digital electric signal $S_{e,r}$ which is available at the output of the receiver 5.

In optical transmission systems the aim is, inter alia longer transmission distances. However, generally the pulses of the optical pulse pattern to be transmitted by the transmitter 3 comprise radiation having different wavelength components. Since the transmission medium is generally dispersive, i.e. the delay time in the transmission medium 7 is different for each wavelength, different wavelength components of a pulse will reach the receiver 5 at different instants. Consequently, pulse widening will generally occur, which increases with an increasing length of the transmission medium.

Another phenomenon impeding the realisation of long transmission distances is the inaccurate definition of the pulse position with respect to the pulse period. This phenomenon is referred to as time jitter. It is caused by the fact that instabilities in the transmission medium will lead to a variation in the position of the signal pulses along the time axis. On the other hand, the clock signal, in other words the repetition time with which the arriving signal pulses are detected in the receiver, is a constant. In fact, the clock signal is determined as a mean value of a number of pulse periods of the signal pulse series. Due to the spread of the signal pulses with respect to time, caused by line instabilities, the relevant signal pulse and a pulse of the clock signal will not coincide and give rise to erroneous information in the receiver.

Moreover, a data signal is subject to variable damping due to instabilities in the transmission medium during transmission, so that variations in the pulse amplitudes of the signal pulse series will occur.

To limit the degeneration of the signal pulse series transported via the transmission medium due to dispersion, time jitter and variable damping, the transmission medium may be provided with at least one signal-regenerating unit 9. In the optical transmission system 1 of FIG. 1 only one unit 9 is shown. In practice, a plurality of units 9 are regularly spaced apart from each other in the transmission medium 7.

Figure 2A:
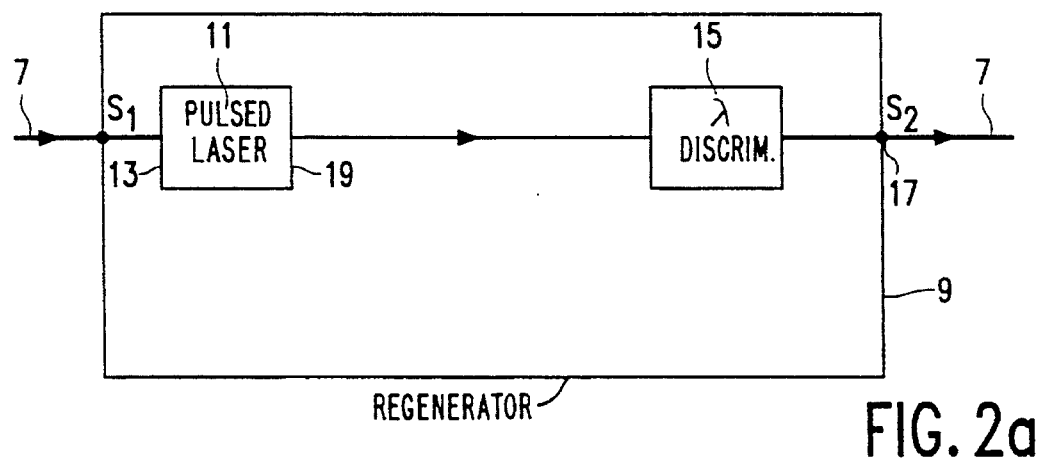
FIGS. 2a and 2b show diagrammatically two preferred embodiments of an optical signal-regenerating unit according to the invention.

The present invention provides a novel optical signal-regenerating unit. FIG. 2a shows this unit diagrammatically. The unit 9 comprises a pulsed laser 11 into which the degenerated optical signal pulse series $S_1$ is injected, for example at the front mirror 13. The pulsed laser 11 is preferably a gain-switched diode laser. In such a laser, a current pulse is applied to the diode laser which in its turn transmits an optical pulse. The pulse period T of the pulsed laser 11 is equal to the modulation period of the signal pulse series $S_1$, the two signals being synchronized with each other in a known manner. The signal pulse series $S_1$ to be regenerated has a wavelength $\lambda_d$. By injecting a pulse of the signal pulse series $S_1$ into the pulsed laser 11 at an instant when a pulse is built up in the pulsed laser, for which it holds that $E(P_m) > E(LP_j)$, the pulsed laser will be forced to supply the next pulse at a wavelength $\lambda_d$. $E(P_m)$ is the radiation energy of a pulse of the signal pulse series $S_1$ injected into the pulsed laser 11 at the relevant instant and $E(LP_j)$ is the radiation energy built up in the pulsed laser 11 at the relevant instant. The original spectrum, generally a multimode spectrum, of the pulsed laser 11 is converted into a single mode spectrum whose wavelength is equal to the wavelength of the injected radiation, provided that the relative timing between the pulses of the signal pulse series $S_1$ and the pulses from the pulsed laser 11 is such that the above-mentioned relation is satisfied. The wavelength of the pulsed laser 11 is thus only converted to $\lambda_d$ for optical pulses representing a digital "1" in the data signal to be transmitted. The time interval preceding the generation of a pulse in the pulsed laser 11, within which the injection of a pulse of the signal pulse series is to take place, is approximately 100 psec. The intensity and the pulse shape of the pulses from the pulsed laser are not influenced by the injection. However, the wavelength is taken over from the signal pulse series. The radiation of the pulsed laser 11 after injection thus comprises a regenerated signal pulse series $S_2$ of wavelength $\lambda_d$ and having the intensity and the pulse shape of the pulses from the pulsed diode laser 11. This signal pulse series $S_2$ is coupled out at the rear mirror 19 and may be further transported through the transmission medium 7.

Moreover, the unit 9 may be provided with a wavelength discriminator 15 for distinguishing the radiation of wavelength $\lambda_d$ of the radiation supplied by the pulsed laser 11 from radiation of different wavelengths.

An optical signal-regenerating unit 9 as described may alternatively be used to advantage in a receiver for regenerating an arrived signal pulse series before transmitting it to one or more detection channels in order to prevent pulse shape degradation from leading to erroneous detection. In that case, the unit 9 should further comprise a wavelength discriminator 15 so as to make a clear distinction between a digital "0" and a digital "1" represented in the regenerated pulse series $S_2$ of the pulsed laser 11 after injection, because the detection is then based on the wavelength.

Radiation of wavelength $\lambda_d$ may be distinguished in two different manners. The first possibility is to render the selection wavelength of the discriminator, i.e. the wavelength passed by the discriminator, equal to the wavelength of the signal pulse series ($\lambda_d$) to be transported. In that case, a signal pulse series having a wavelength of $\lambda_d$ and a pulse pattern which is equal to that of the original signal pulse series before regeneration is produced at the output of the discriminator. This possibility is preferred if the unit 9 is used in the transmission medium because it is desirable to maintain the same wavelength throughout the transmission medium for the signal pulse series to be transported.

The second possibility is to render the selection wavelength of the discriminator equal to the original wavelength of the pulsed laser. In that case, the radiation of wavelength $\lambda_d$ is blocked and a signal pulse series which is complementary to the original signal pulse series is produced at the output of the discriminator. The latter possibility has the advantage that the discriminator can be more easily tuned to its selection wavelength because the discriminator and the pulsed laser are in each other's proximity, while the wavelength $\lambda_d$ of the original signal pulse series is determined by the laser in the transmitter. This possibility is preferred if the unit according to the invention is used in the receiver.

Figure 2B:
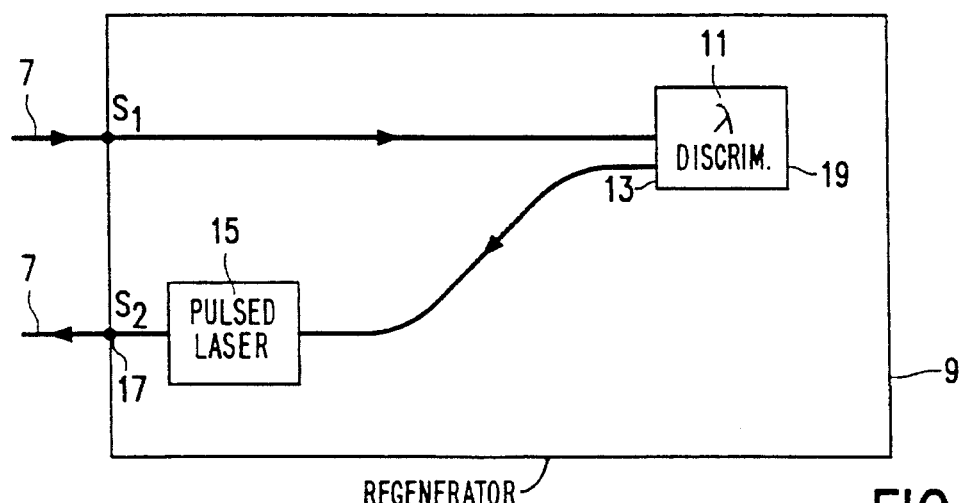

FIG. 2b shows another possible configuration of the optical signal-regenerating unit 9 according to the invention. The radiation from the pulsed laser after injection is now coupled out at the front mirror 13 of the pulsed laser 11.

The pulsed laser 11 is preferably a diode laser having a Fabry-Pérot resonant cavity in which a mode fits in accordance with the wavelength of the signal pulse series to be regenerated. In that case, radiation will be coupled into the pulsed laser 11 in an optimum manner.

We claim:

1. An optical signal-regenerating unit for regenerating a received optical signal pulse series $S_1$ having a modulation period T and a wavelength $\lambda_d$, comprising:

a pulsed laser generating an optical pulse series $S_2$ having a pulse period equal to said modulation period T, said laser having an input face at which the pulses of the received optical pulse series $S_1$ are injected at instants at which an injected pulse has a radiation energy which exceeds the radiation energy of a pulse then being built up in said laser, thereby converting a multimode spectrum of said laser into a single mode spectrum having a wavelength equal to the wavelength $\lambda_d$ of the received optical pulse series;

said laser further having an output face at which said generated pulse series $S_2$ is produced having said wavelength $\lambda_d$, so that said generated pulse series $S_2$ is a regeneration of the received pulse series $S_1$.

2. An optical signal-regenerating unit as claimed in claim 1, characterized in that the unit further comprises a wavelength discriminator arranged in the path of the radiation generated by the pulsed laser after injection, which wavelength discriminator passes radiation of wavelength $\lambda_d$ only.

3. An optical signal-regenerating unit as claimed in claim 1, characterized in that the unit further comprises a wavelength discriminator arranged in the path of the radiation generated by the pulsed laser after injection, which wavelength discriminator blocks radiation of wavelength $\lambda_d$ only.

4. An optical signal-regenerating unit as claimed in claim 1, characterized in that the pulsed laser is a diode laser having a Fabry-Pérot resonant cavity, which cavity has a resonant mode which corresponds to the wavelength $\lambda_d$ of the received optical signal pulse series.

\* \* \* \* \*